(12) United States Patent
Strein et al.

(10) Patent No.: US 8,136,134 B2
(45) Date of Patent: Mar. 13, 2012

(54) SYSTEM AND METHOD FOR DYNAMICALLY TRANSMITTING NETWORK ALERT SYSTEM (NAS) INFORMATION FROM TELEVISION NETWORK TO STATIONS USING INFORMATION EMBEDDED IN AN HDTV SIGNAL

(75) Inventors: Michael J. Strein, Oakdale, NY (US); Kenneth J. Michel, Brightwaters, NY (US); Steven Machanic, Dumont, NJ (US)

(73) Assignee: Disney Enterprises Inc., Burbank, CA (US)

( * ) Notice: Subject to any disclaimer, the term of this patent is extended or adjusted under 35 U.S.C. 154(b) by 275 days.

(21) Appl. No.: 12/403,480

(22) Filed: Mar. 13, 2009

(65) Prior Publication Data
US 2009/0231488 A1   Sep. 17, 2009

Related U.S. Application Data

(63) Continuation-in-part of application No. 12/355,920, filed on Jan. 19, 2009.

(60) Provisional application No. 61/036,538, filed on Mar. 14, 2008, provisional application No. 61/074,255, filed on Jun. 20, 2008.

(51) Int. Cl.
*H04N 7/10* (2006.01)
*H04N 7/025* (2006.01)

(52) U.S. Cl. ........................... 725/33; 725/32
(58) Field of Classification Search ............ 725/32, 725/33
See application file for complete search history.

(56) References Cited

U.S. PATENT DOCUMENTS

| 5,512,935 | A  | * | 4/1996 | Majeti et al. ............... 725/33 |
| 7,768,388 | B2 | * | 8/2010 | Putterman et al. ............ 340/531 |
| 2002/0078446 | A1 | * | 6/2002 | Dakss et al. ................ 725/37 |
| 2006/0184994 | A1 | * | 8/2006 | Eyer et al. ................. 725/136 |
| 2007/0174876 | A1 | * | 7/2007 | Maggio et al. ............... 725/78 |
| 2007/0296575 | A1 | * | 12/2007 | Eisold et al. ............ 340/539.16 |
| 2009/0235305 | A1 | * | 9/2009 | Pugel ..................... 725/33 |
| 2010/0122284 | A1 | * | 5/2010 | Yoon et al. ................ 725/33 |

FOREIGN PATENT DOCUMENTS
WO   WO 2008030069 A1 * 3/2008

OTHER PUBLICATIONS
SMPTE Standard SMPTE 334M-2000.

* cited by examiner

*Primary Examiner* — Brian Pendleton
*Assistant Examiner* — Jonathan V Lewis
(74) *Attorney, Agent, or Firm* — Smith Risley Tempel Santos LLC; Michael J. Tempel

(57) ABSTRACT

A system for dynamically transmitting network alert system (NAS) information from a television network to an affiliate station using information embedded in an HDTV signal includes a program data server configured to provide network alert system (NAS) data, a network video programming source configured to provide network video programming, a data inserter configured to insert the NAS data into vertical ancillary (VANC) space of a high definition television (HDTV) signal to develop a combined network video programming and NAS data signal, and a transmission facility configured to transmit the combined network video programming and NAS data signal.

6 Claims, 8 Drawing Sheets

SYSTEM AND METHOD FOR DYNAMICALLY TRANSMITTING NETWORK ALERT SYSTEM (NAS) INFORMATION FROM TELEVISION NETWORK TO STATIONS USING INFORMATION EMBEDDED IN AN HDTV SIGNAL

CROSS-REFERENCE TO RELATED APPLICATION

This application claims the benefit of the filing date of U.S. Provisional Application No. 61/036,538, filed on Mar. 14, 2008, entitled "Transmission Of Program System Information From Television Network To Stations Using Information Embedded In An HDTV Signal," the entire disclosure of which is hereby incorporated into this document be reference; and U.S. Provisional Application No. 61/074,255, filed on Jun. 20, 2008, entitled "Network Alert System (NAS) Information and Affiliate Communication Services (ACS) Transmissions From ABC TV Network To ABC Stations Using Information Embedded In The HDTV Signal," the entire disclosure of which is hereby incorporated into this document be reference; and is a continuation-in-part of U.S. patent application Ser. No. 12/355,920, filed on Jan. 19, 2009, entitled "System And Method For Dynamically Transmitting Program System Information From Television Network To Stations Using Information Embedded In An HDTV Signal," the entire disclosure of which is hereby incorporated into this document by reference.

BACKGROUND

A television network typically provides programming to a large number of stations, sometimes referred to as "affiliates' or "affiliate stations." In addition to the actual programming, additional information relating to updates and changes to the programming schedule, and/or changes to the transmission infrastructure are also sent to the affiliate stations. These changes are typically communicated to the affiliate stations in what are referred to as Network Alert System (NAS) messages. Typically, an NAS message contains one or more descriptions of pending changes of which stations need to be aware. These changes include, for example, a news report special, a late-breaking event, or other programming changes. NAS messages are also used to communicate infrastructure or network transmission changes, such as having the affiliate station tune their receive feed to a new or different satellite station or service, etc. NAS messages are typically provided to a master control facility associated with the affiliate station. In standard TV transmission systems (i.e., those that broadcast using the analog NTSC system), NAS messages are carried as part of the analog video signal.

Current programming technology dictates that over-the-air programming sent from a network to an affiliate station be provided in what is referred to as a "digital" format, sometimes referred to as digital television (DTV). Included in a digital format may be high definition programming, referred to as high definition television (HDTV). Unfortunately, there is no current solution for transmission of NAS messages in a DTV or HDTV format.

Therefore, there is a need for a way of efficiently and easily delivering NAS messages to an affiliate station using a DTV or HDTV format.

SUMMARY

Embodiments of the invention include a system for dynamically transmitting network alert system (NAS) information from a television network to an affiliate station using information embedded in an HDTV signal comprising a program data server configured to provide network alert system (NAS) data, a network video programming source configured to provide network video programming, a data inserter configured to insert the NAS data into vertical ancillary (VANC) space of a high definition television (HDTV) signal to develop a combined network video programming and NAS data signal, and a transmission facility configured to transmit the combined network video programming and NAS data signal.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
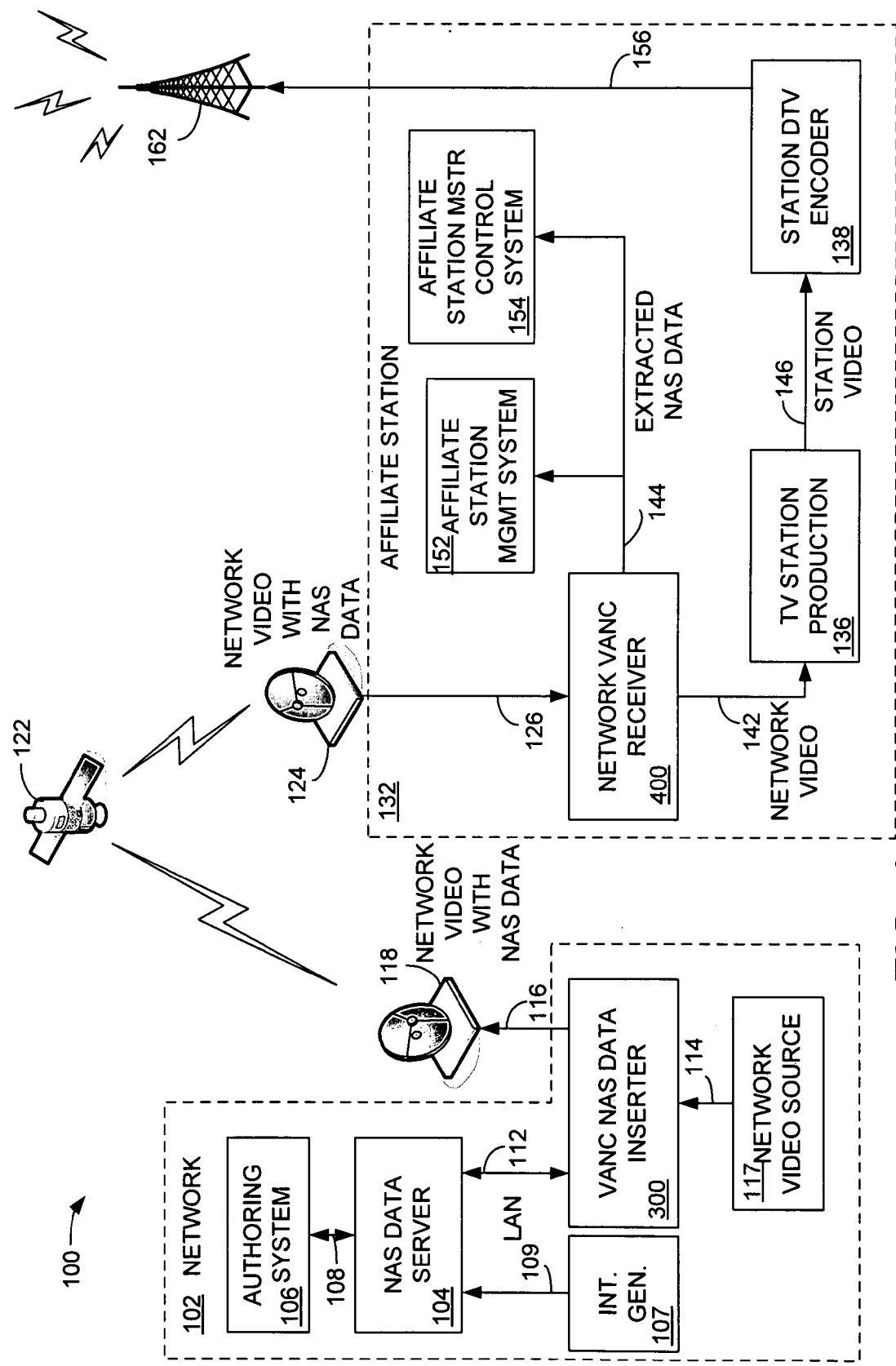
FIG. 1 is a block diagram illustrating an embodiment of a system for transmitting network alert system information from a television network to an affiliate station using information embedded in an HDTV signal.

The system and method for dynamically transmitting network alert system (NAS) information from a television network to an affiliate station using information embedded in an HDTV signal can be implemented in any digital television delivery system that transmits a high-definition (HD) television signal. The structure of the HD television signal can be used to transmit additional information, sometimes referred to as ancillary data. In an embodiment, the HD television signal is used to transmit network alert system (NAS) information along with the digitally transmitted TV signal.

The system and method for dynamically transmitting network alert system information from a television network to an affiliate station using information embedded in an HDTV signal can be implemented in hardware, software, or a combination of hardware and software. When implemented in hardware, the system and method for dynamically transmitting network alert system information from a television network to an affiliate station using information embedded in an HDTV signal can be implemented using specialized hardware elements and logic. When the system and method for dynamically transmitting network alert system information from a television network to an affiliate station using information embedded in an HDTV signal is implemented in software, the software can be used to control the various components in a system and network associated with the program. The software can be stored in a memory and executed by a suitable instruction execution system (microprocessor). The hardware implementation of the system and method for dynamically transmitting network alert system information from a television network to an affiliate station using information embedded in an HDTV signal can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for dynamically transmitting network alert system information from a television network to an affiliate station using information embedded in an HDTV signal comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1 is a block diagram illustrating an embodiment of a system 100 that can implement the system for dynamically transmitting network alert system information from a television network to an affiliate station using information embedded in an HDTV signal. The system 100 includes a television network 102, a transmission system including a satellite communication uplink station 118, a communication satellite 122, a satellite communication downlink station 124 and an affiliate station 132. Details of the transmission system, including the satellite communication uplink station 118, the communication satellite 122, and the satellite communication downlink station 124, which can be capable of bi-directional communication, are not described herein as they are known to those skilled in the art. Further, other transmission systems, such as, for example, terrestrial transmission systems, wired or wireless transmission systems, or other transmission systems, can be implemented in the system for dynamically transmitting network alert system information from a television network to an affiliate station using information embedded in an HDTV signal.

The network 102 includes a network alert system (NAS) data server 104 in bidirectional communication with an authoring system 106 over connection 108. The authoring system 106 facilitates the generation of a network alert system (NAS) message. In an embodiment, the authoring system 106 can be implemented as a computer or computer terminal at which an individual creates a network alert message by, for example, manually typing the message. In other embodiments, the NAS message may be created in other ways. The NAS message is provided to the NAS data server 104 over connection 108. When completed, the authoring system 106 provides the NAS message to the NAS data server 104 using what is referred to as a "push" system in which the NAS messages are automatically provided to the NAS data server 104.

The network 102 also includes an interrupt signal generator 107. The interrupt signal generator 107 can be implemented as one or more simple switches that, when closed, establish a connection to the NAS data server 104 to enable what is referred to as a "general purpose interrupt" (GPI). The GPI signal is provided to the NAS data server 104 over connection 109. The GPI signal causes the NAS data server 104 to generate a default message that is sent to the affiliate station 132. For example, the default message can include information such as, "Please standby—a special report is occurring now," or the like. Such a message can be triggered from various locations within the network 102 and is shown as originating from the interrupt signal generator 107 for simplicity.

The network alert system (NAS) data server 104 is also in bidirectional communication through channel 112 with a VANC NAS data inserter 300. The NAS data server 104 contains data relating to network alert system information, such as an NAS message described above that is provided from the authoring system 106. The NAS data server 104 formats and temporarily stores network alert system (NAS) messages.

The NAS message is transferred over a bidirectional communication channel 112 from the NAS data server 104 to a VANC NAS data inserter 300. The VANC NAS data inserter 300 polls the NAS data server 104 to determine whether a new NAS message is available. The communication channel 112 can be, for example, a local area network (LAN), or any other communication network within the television network 102. In an embodiment, the VANC NAS data inserter 300 is a communication element that can insert ancillary data into the vertical ancillary (VANC) space of a high-definition television (HDTV) video signal. The insertion of information into the vertical ancillary space of an HDTV signal is described in SMPTE (The Society Of Motion Picture And Television Engineers) standard 334M-200 entitled "Vertical Ancillary Data Mapping for Bit-Serial Interface," which is incorporated herein by reference.

The VANC NAS data inserter 300 also receives network video source programming over connection 114 from a network video source 117. In accordance with an embodiment of the system for dynamically transmitting network alert system information from a television network to an affiliate station using information embedded in an HDTV signal, the VANC NAS data inserter 300 dynamically combines NAS message information data received from the NAS data server 104 over connection 112 with network video programming supplied by the network video source 117 over connection 114. This combined network video programming and NAS data signal is sent over connection 116 to the satellite communication uplink station 118.

The satellite communication uplink station 118 transmits the combined network video programming and NAS data signal via satellite 122 to the satellite communication downlink station 124. The satellite communication downlink station 124 communicates the received combined network video programming and NAS data signal over connection 126 to a network VANC receiver 400.

In addition to the network VANC receiver 400, the affiliate station 132 includes an affiliate station management system 152, an affiliate station master control system 154, a television station production facility 136 and a station digital television (DTV) encoder 138. The network VANC receiver 400 separates the network video programming signal from the NAS data, as will be described below. The network video programming is provided over connection 142 to the television station production facility 136. The NAS data is provided over connection 144 to the affiliate station management system 152 and to the affiliate station master control system 154. The connections 142 and 144 can be a local area network (LAN), or any other communication channel or communication bus within the affiliate station 132.

In an embodiment, the NAS data on connection 144 is formatted by the network VANC receiver 400 as XML/HTML data, with the network VANC receiver 400 acting as a web server. In this manner, through a typical Internet Protocol (IP) connection, the NAS messages may be viewed and displayed remotely.

The affiliate station management system 152 can be implemented as a single or distributed computer system over which station operation and NAS message information is provided to the management personnel of the affiliate station 132. Affiliate station management personnel use the NAS messages for information gathering, and to be aware of late breaking network changes.

The affiliate station master control system 154 can be implemented as a single or distributed computer system that manages the programming of the affiliate station 132. For example, NAS message information is provided to the affiliate station master control system 154 so that the affiliate station master control system 154 can provide accurate and current programming. It is desirable for operators of the affiliate station master control system 154 to see the messages immediately, as programming changes can affect the station's output signal.

The NAS data on connection 144 is used by the affiliate station master control system 154 to provide updated and current programming information so that the affiliate station 132 is always current on its programming. The television station production facility 136 generates the station video signal over connection 146 which is also provided to the station DTV encoder 138.

The station DTV encoder 138 provides the station video signal over connection 156 to a transmission facility 162. In an embodiment, the transmission facility 162 can be, for example, an over-the-air broadcast facility that wirelessly transmits the affiliate station television signal to television receivers. Alternatively, the transmission facility 162 can be a cable television (CATV) broadcast facility that transmits the affiliate station television signal over a cable, or other wired or wireless, distribution system.

Figure 2:
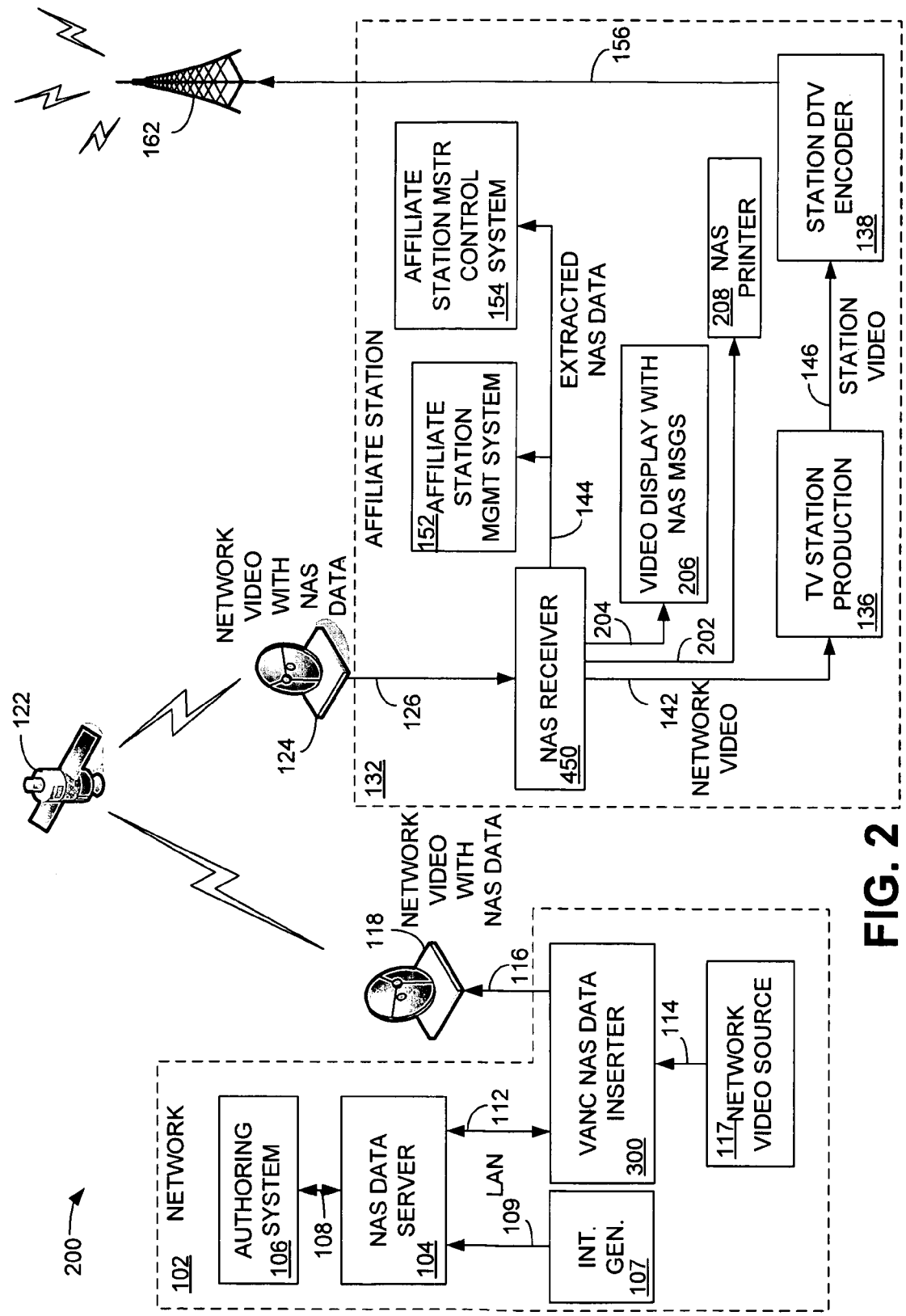
FIG. 2 is a block diagram illustrating an alternative embodiment of a system for transmitting network alert system information from a television network to an affiliate station using information embedded in an HDTV signal.

FIG. 2 is a block diagram illustrating an alternative embodiment of a system 200 that can implement the system for dynamically transmitting network alert system information from a television network to an affiliate station using information embedded in an HDTV signal. Certain elements in the embodiment 200 are similar to the corresponding elements in the system 100, and will not again be described in detail. For example, the elements in the network 102, and the transmission system including the satellite communication uplink station 118, the satellite 122 and the satellite communication downlink station 124 are similar to that described above and the description thereof will not be repeated.

With regard to the system 200, the satellite communication downlink station 124 communicates the received combined network video programming and NAS data signal over connection 126 to a network alert system (NAS) receiver 450. In the embodiment shown in FIG. 2, the NAS receiver 450 is used in conjunction with or in place of the network VANC receiver 400 to receive and provide the NAS message information to the affiliate station 132.

In addition to the NAS receiver 450, the affiliate station 132 includes an affiliate station management system 152, an affiliate station master control system 154, a television station production facility 136, a station digital television (DTV) encoder 138, a video display 206 and an NAS printer 208.

The video display 206 can display received NAS message information on a video monitor as discrete NAS messages, or as NAS messages overlaid on other video programming. Because it is desirable that an operator of the affiliate station master control system 154 see the NAS messages immediately, this video overlay is typically displayed in the monitor wall of the master control area, visible to all operators.

The NAS printer 208 can provide printed NAS messages. In the instance where an operator of the affiliate station master control system 154 is out of the room, or otherwise occupied, the NAS message will automatically print, allowing the operator to view the message upon return.

The NAS receiver 450 separates the network video programming signal from the NAS data, as will be described below. The network video programming is provided over connection 142 to the television station production facility 136. The NAS data is provided over connection 144 to the affiliate station management system 152 and to the affiliate station master control system 154, over connection 202 to the NAS printer 208 and over connection 204 to the video display 206. The connections 142, 144, 202 and 204 can be a local area network (LAN), or any other communication channel or communication bus within the affiliate station 132.

The affiliate station management system 152 can be implemented as a single or distributed computer system over which station operation and NAS message information is provided to the management personnel of the affiliate station 132. Affiliate station management personnel use the NAS messages for information gathering, and to be aware of late breaking network changes.

The affiliate station master control system 154 can be implemented as a single or distributed computer system that manages the programming of the affiliate station 132. For example, NAS message information is provided to the affiliate station master control system 154 so that the affiliate station master control system 154 can provide accurate and current programming. Operators of the affiliate station master control system 154 typically need to see the messages immediately, as programming changes can affect the station's output signal.

The NAS data on connection 144 is used by the affiliate station master control system 154 to provide updated and current programming information so that the affiliate station 132 is always current on its programming. The television station production facility 136 generates the station video signal over connection 146 which is also provided to the station DTV encoder 138.

The station DTV encoder 138 provides the station video signal over connection 156 to a transmission facility 162. In an embodiment, the transmission facility 162 can be, for example, and over-the-air broadcast facility that wirelessly transmits the affiliate station television signal to television receivers. Alternatively, the transmission facility 162 can be a cable television (CATV) broadcast facility that transmits the affiliate station television signal over a cable, or other wired or wireless, distribution system.

Figure 3:
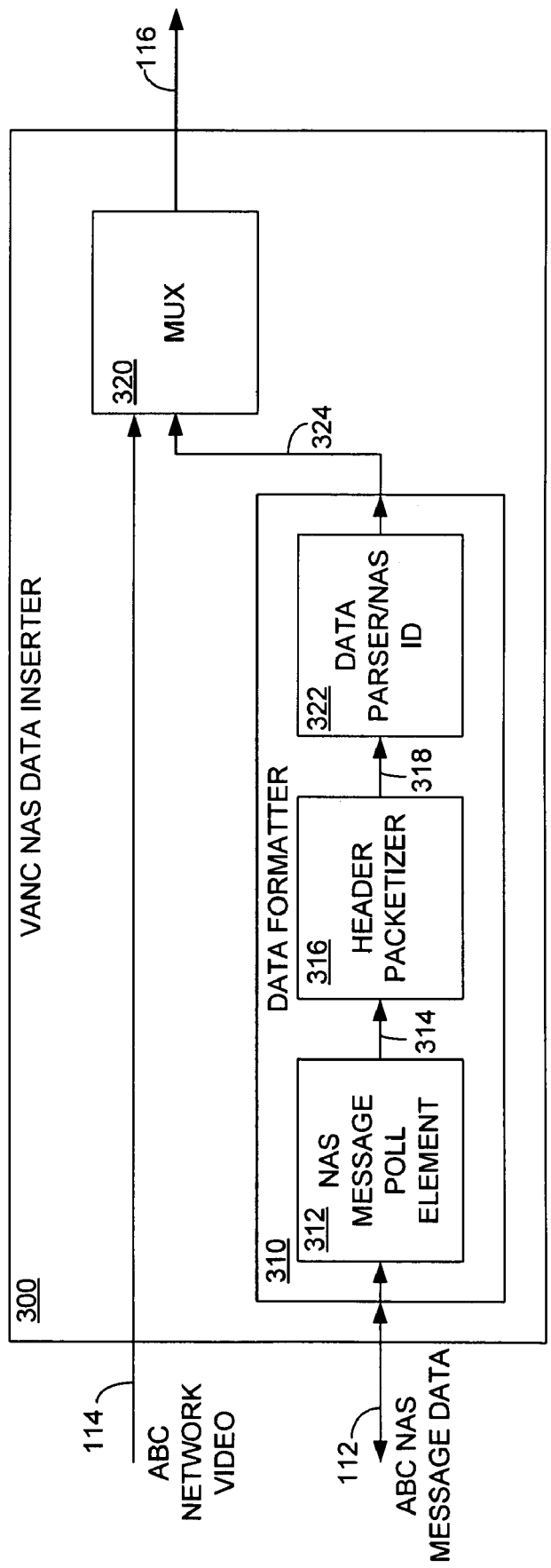
FIG. 3 is a block diagram illustrating an embodiment of the VANC NAS data inserter of FIG. 1 and FIG. 2.

FIG. 3 is a block diagram illustrating an embodiment of the VANC NAS data inserter of FIG. 1 and FIG. 2. The VANC NAS data inserter 300 includes a data formatter 310 and a multiplexer 320.

The data formatter 310 comprises a network alert system (NAS) message poll module 312, a header packetizer 316 and a data parser/NAS identification element 322. The data formatter 310 dynamically receives the most updated, recent and relevant NAS data having the latest alert information from the NAS data server 104 (FIG. 1 and FIG. 2) over connection 112.

The NAS message poll module 312 is a service that polls particular addresses of the NAS data server 104 (FIG. 1 and FIG. 2) for NAS messages. In an embodiment, the NAS message poll module 312 polls the Internet Protocol (IP) address of the NAS data server 104 for NAS messages. The output of the NAS message poll module 312 is an ASCII text file provided over connection 314 to the header packetizer 316. The ASCII text file includes a timestamp that is used by the header packetizer 316 to identify the NAS message.

The header packetizer 316 creates an NAS message header and formats the NAS message into 60 frame per second packets so that it may fit within the framework of the digital video distribution path. Messages that are longer than 60 frames are divided to fit within this framework and spread across multiple video frames.

The data parser/NAS identification element 322 receives the header packets over connection 318, parses the data and adds a unique NAS identifier. A timestamp associated with the ASCII text of the message is used in creating a unique identifier that identifies the message for distribution and reception at the affiliate station 132. This unique identifier also separates the NAS message data from any other data that may use the distribution path downstream. The output of the data formatter is provided over connection 324 to the multiplexer 320.

The multiplexer 320 receives at a first input the network video programming signal over connection 114 (FIG. 1 and FIG. 2) and receives at a second input the formatted NAS data on connection 324. In an embodiment, the multiplexer 320 inserts the formatted NAS data signal into video line 12 using the data ID (DID)0x53, and using the secondary data ID (SDID) 0x01, as per SMPTE 334M-200 guidelines for the insertion of user-defined data into an HDTV signal. Alternatively, other lines in the video stream can be used to insert the NAS data signal into the video signal, as provided by SMPTE 334M-200 guidelines.

In an embodiment, the multiplexer 320 also parses the NAS data such that it will not overflow the data buffers (not shown) used for satellite transmission. In an embodiment, the multiplexer 320 parses the NAS data, combines the NAS data with any other unique data that may be traveling on this path, and typically limits the NAS data transmission to less than approximately 75 bytes per video frame. The output of the multiplexer 320 is the combined network video programming and NAS data signal on connection 116.

Figure 4:
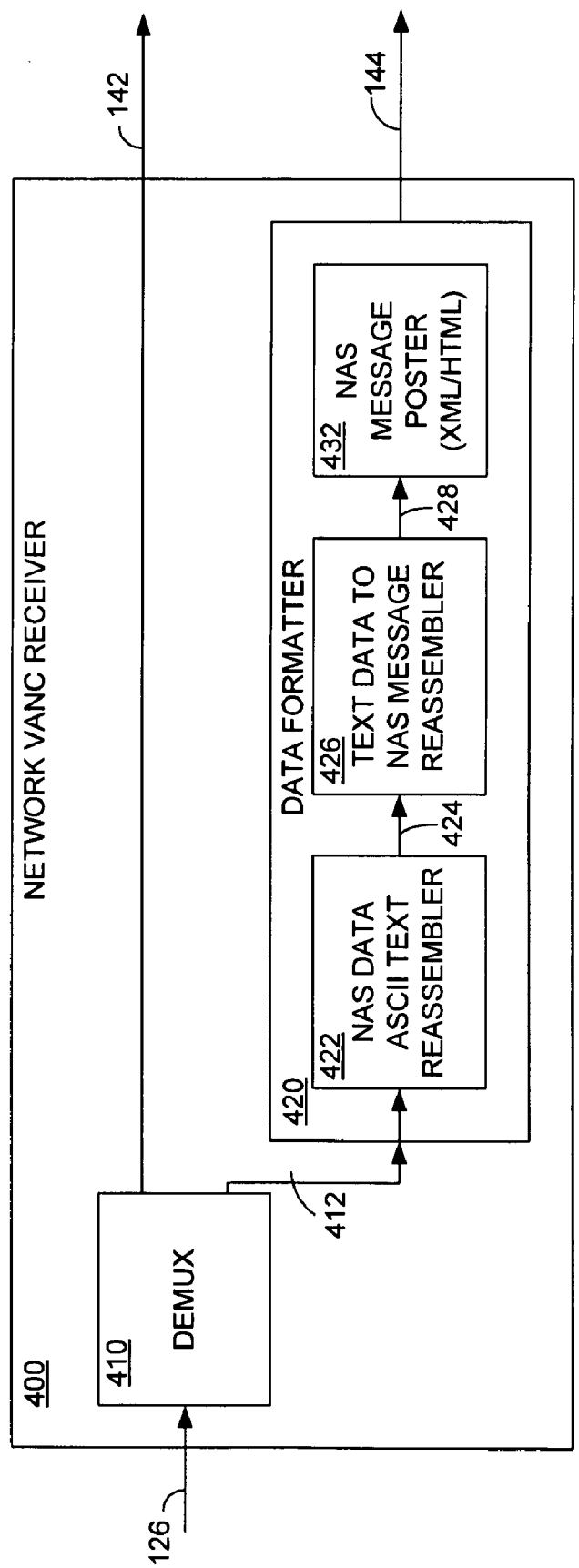
FIG. 4 is a block diagram illustrating an embodiment of the network VANC receiver of FIG. 1.

FIG. 4 is a block diagram illustrating an embodiment of the network VANC receiver of FIG. 1. The network VANC receiver 400 includes a demultiplexer 410 and a data formatter 420. The received combined network video programming and NAS data signal is received over connection 126 by the demultiplexer 410. The demultiplexer 410 extracts the NAS data signal from video line 12, DID 0x53, SDID 0x01, or from whatever location the NAS data was inserted by the multiplexer 320 (FIG. 3), and provides the extracted NAS data over connection 412 to a data formatter 420. The demultiplexer 410 also provides the network video program signal over connection 142, as described above.

The data formatter 420 comprises an NAS data ASCII text reassembler 422, a text data to NAS message reassembler 426 and an NAS message post element 432. The NAS data ASCII text reassembler 422 receives the demultiplexed VANC data from the demultiplexer 410 and reassembles the VANC data into ASCII text data.

The output of the NAS data ASCII text reassembler 422 is provided over connection 424 to the text data to NAS message reassembler 426. The text data to NAS message reassembler 426 reassembles the ASCII text data into a complete NAS message. Because the NAS message was broken up and spread across video frames by the header packetizer 316 (FIG. 3), the text data to NAS message reassembler 426 re-creates the original, cohesive message.

The NAS message over connection 428 is received by the NAS message post element 432, which posts the NAS message in XML/HTML format to an internal web server (not shown). In this manner, the NAS message is available for retrieval from remote locations via a LAN connection, such as connection 144. The data formatter 420 also provides the NAS message data over connection 144, as described above.

Figure 5:
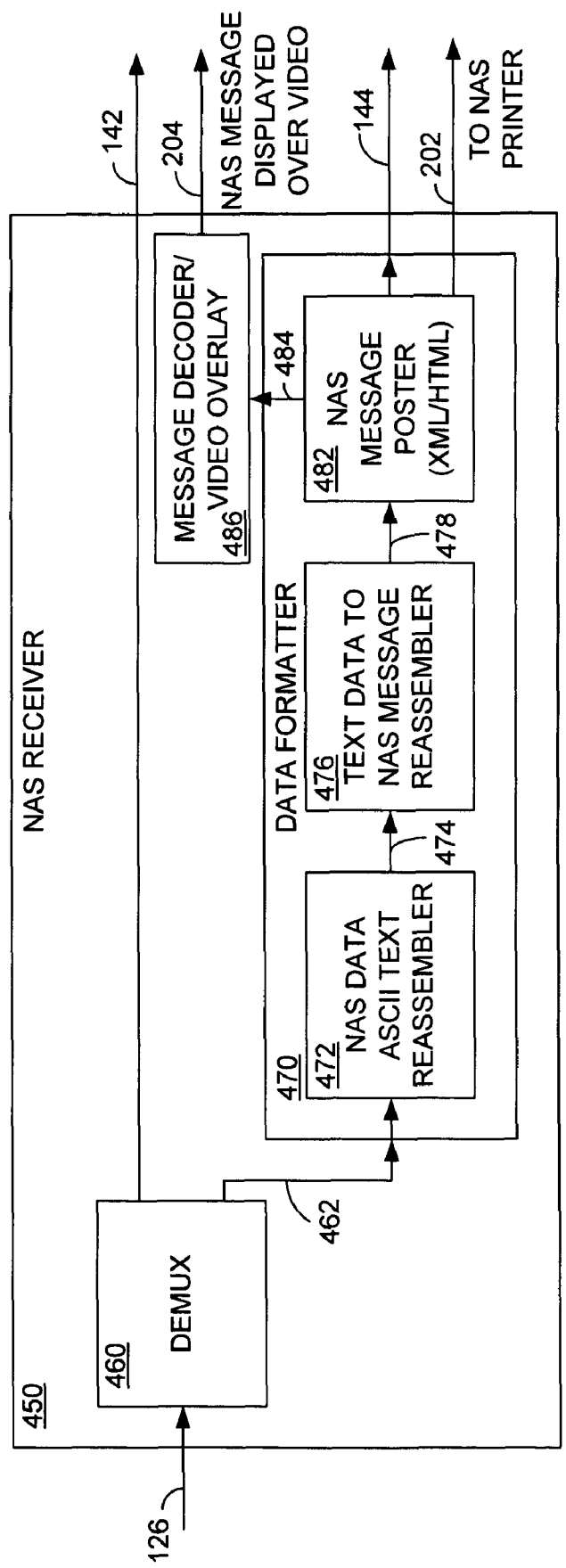
FIG. 5 is a block diagram illustrating an embodiment of the NAS receiver of FIG. 2.

FIG. 5 is a block diagram illustrating an embodiment of the NAS receiver of FIG. 2. The NAS receiver 450 includes a demultiplexer 460 and a data formatter 470. The received combined network video programming and NAS data signal is received over connection 126 by the demultiplexer 460. The demultiplexer 460 extracts the NAS data signal from video line 12, DID 0x53, SDID 0x01, or from whatever location the NAS data was inserted by the multiplexer 320 (FIG. 3), and provides the extracted NAS data over connection 462 to a data formatter 470. The demultiplexer 460 also provides the network video program signal over connection 142, as described above.

The data formatter 470 comprises an NAS data ASCII text reassembler 472, a text data to NAS message reassembler 476 and an NAS message post element 482. The NAS data ASCII text reassembler 472 receives the demultiplexed NAS data from the demultiplexer 460 and reassembles the NAS data into ASCII text data.

The output of the NAS data ASCII text reassembler 472 is provided over connection 474 to the text data to NAS message reassembler 476. The text data to NAS message reassembler 476 reassembles the ASCII text data into a complete NAS message. Because the NAS message was broken up and spread across video frames by the header packetizer 316 (FIG. 3), the text data to NAS message reassembler 476 re-creates the original, cohesive message.

The NAS message over connection 478 is received by the NAS message post element 482, which posts the NAS message in XML/HTML format to an internal web server (not shown). In this manner, the NAS message is available for retrieval from remote locations via a LAN connection, such as connection 144. The NAS message post element 482 also provides an output over connection 202 so that the NAS messages can be sent to an NAS printer 208 (FIG. 2).

The NAS message post element 482 also provides an output over connection 484 to a message decoder and video overlay element 486. The message decoder and video overlay element 486 provides a signal over connection 204 that includes the NAS message overlaid on a video signal for display by the video display element 206 (FIG. 2). The data formatter 420 also provides the NAS message data over connection 144, as described above.

Figure 6:
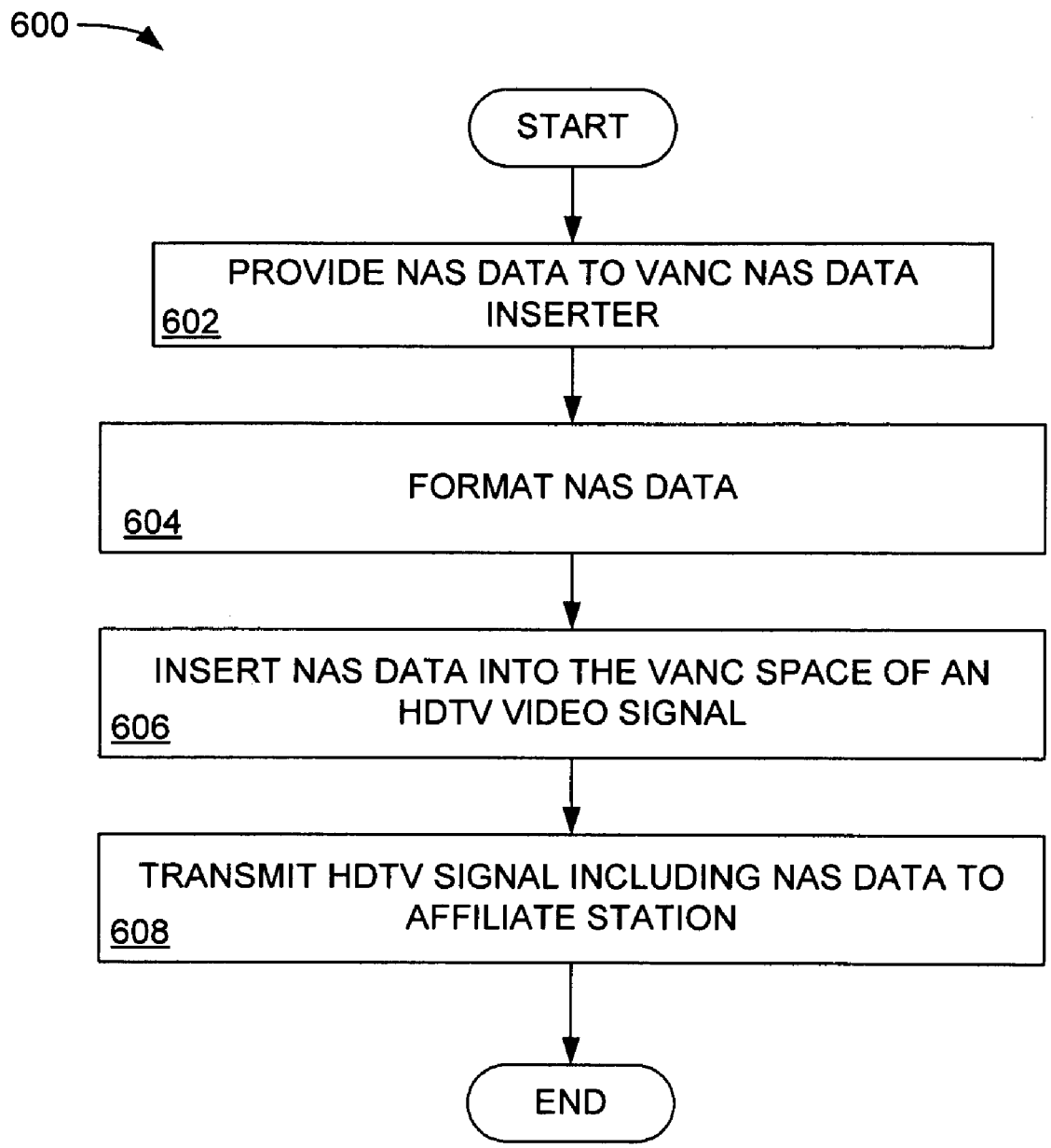
FIG. 6 is a flowchart describing the operation of an embodiment of the VANC NAS data inserter of FIG. 3.

FIG. 6 is a flowchart 600 describing the operation of an embodiment of the VANC NAS data inserter 300 of FIG. 3. In block 602 the most recent NAS data is dynamically supplied by the NAS data server 104 (FIG. 1; FIG. 2) to the VANC NAS data inserter 300. In an embodiment, the VANC NAS data inserter 300 polls the IP address of the NAS data server 104 to obtain NAS message data. In block 604, the VANC NAS data inserter 300 formats the supplied NAS message data. In block 606, the VANC NAS data inserter 300 inserts the supplied NAS message data into the vertical ancillary (VANC) space of a high definition television (HDTV) video signal. In block 608, the HDTV signal including the combined network video programming and NAS data signal is transmitted to an affiliate station.

Figure 7:
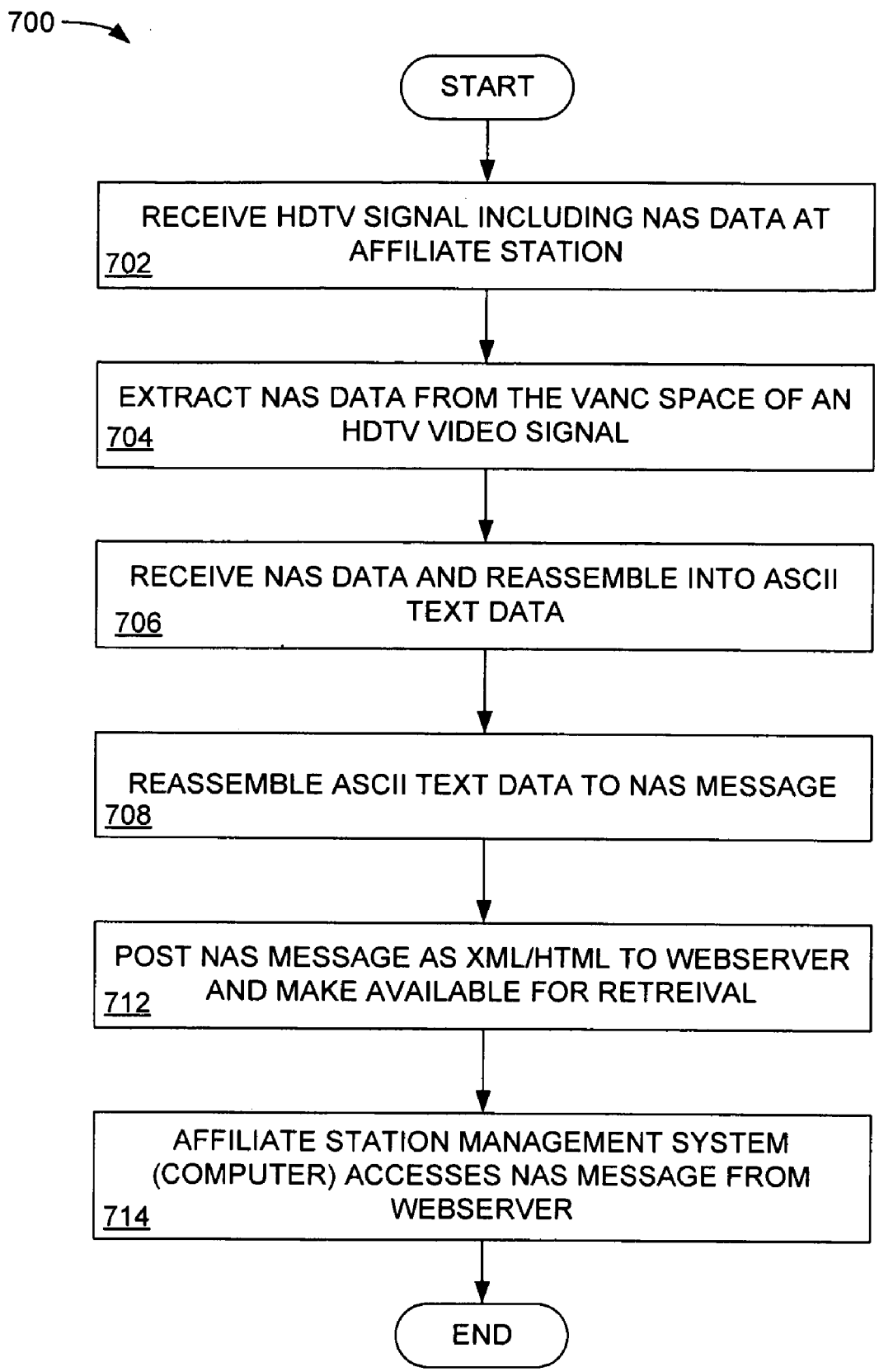
FIG. 7 is a flowchart describing the operation of an embodiment of the network VANC receiver of FIG. 4.

FIG. 7 is a flowchart 700 describing the operation of an embodiment of the network VANC receiver 400 of FIG. 4. In block 702, an HDTV signal including the combined network video programming and NAS message data signal is received at an affiliate station 132 by the network VANC receiver 400. The network video programming is provided over connection 142 (FIG. 4) to the television station production facility 136 (FIG. 1).

In block 704 the most recent NAS message data is extracted from the vertical ancillary (VANC) space of an HDTV video signal by the demultiplexer 410. In block 706, the NAS data to ASCII text reassembler 422 reassembles the received NAS data into ASCII text. In block 708, the text data to NAS message reassembler 426 reassembles the ASCII text data into a complete NAS message. In block 712 the NAS message post element 432 posts the NAS message as XML/HTML to a web server and makes the NAS message available for retrieval. In block 714, personnel associated with the affiliate station management system 152 can access the NAS message from the web server.

Figure 8:
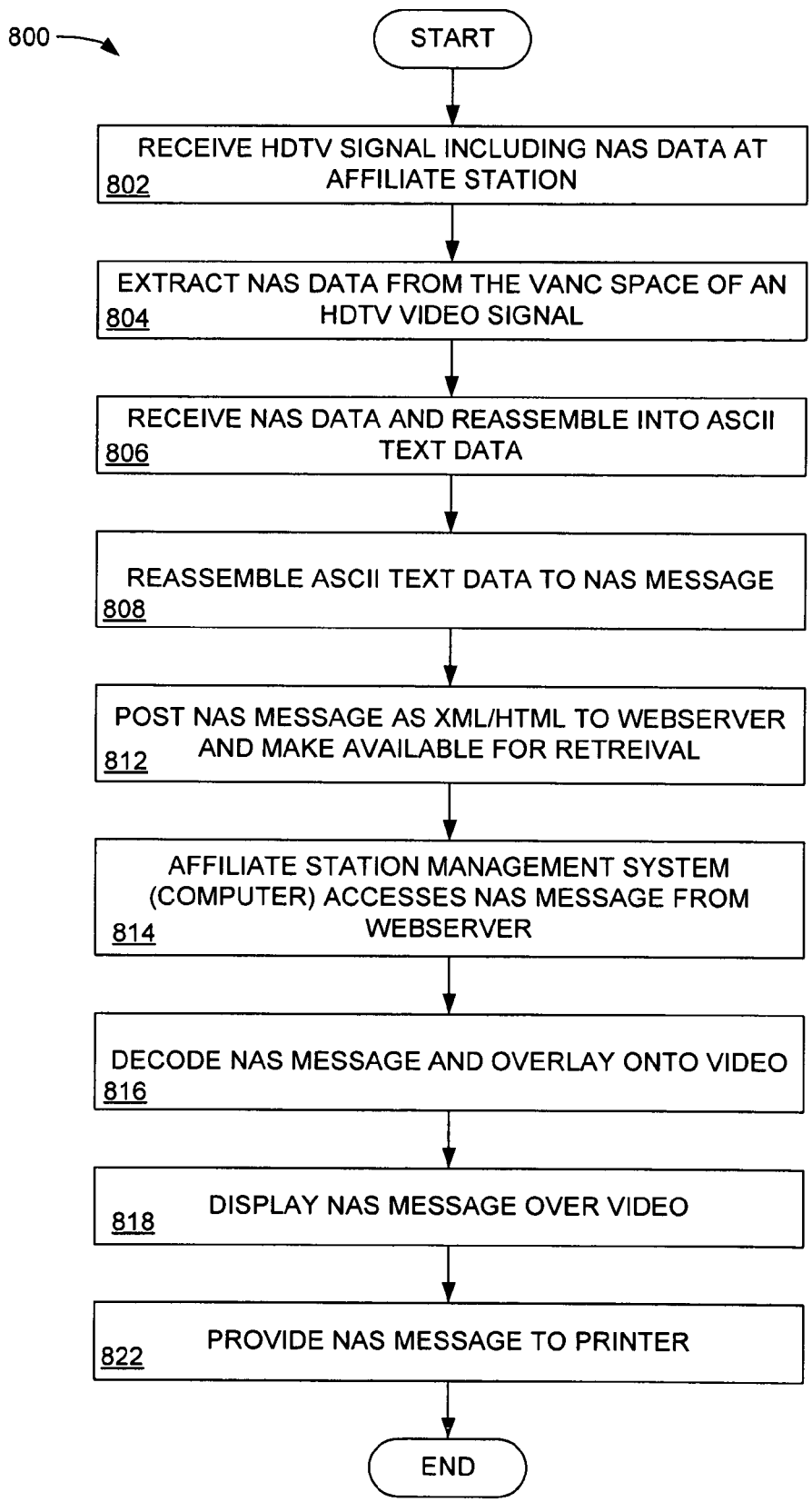
FIG. 8 is a flowchart describing the operation of an embodiment of the NAS receiver of FIG. 5.

FIG. 8 is a flowchart 800 describing the operation of an embodiment of the NAS receiver 450 of FIG. 5. In block 802, an HDTV signal including the combined network video programming and NAS data signal is received at an affiliate station 132 by the NAS receiver 450. The network video programming is provided over connection 142 (FIG. 5) to the television station production facility 136 (FIG. 1).

In block 804 the most recent NAS data is extracted from the vertical ancillary (VANC) space of an HDTV video signal by the demultiplexer 460. In block 806, the NAS data to ASCII text reassembler 472 reassembles the received NAS data into ASCII text. In block 808, the text data to NAS message reassembler 476 reassembles the ASCII text data into an NAS message. In block 812 the NAS message post element 482 posts the NAS message as XML/HTML to a web server and makes the NAS message available for retrieval. In block 814, personnel associated with the affiliate station management system 152 can access the NAS message from the web server.

In block 816, the message decoder and video overlay element 486 decodes the NAS message and provides a signal having the NAS message overlaid on a video signal. In block 818, the NAS message is displayed on a display device. In block 822, the NAS message post element 482 provides the NAS message to an NAS printer.

While various embodiments of the invention have been described, it will be apparent to those of ordinary skill in the art that many more embodiments and implementations are possible that are within the scope of the invention.

What is claimed is:

1. A system for dynamically transmitting network alert system (NAS) information from a television network to an affiliate station using information embedded in an HDTV signal, comprising:

a program data server configured to provide network alert system (NAS) data;

a network video programming source configured to provide network video programming;

a data inserter configured to insert the NAS data into video line 12, data ID (DID) 0x53, secondary data ID (SDID) 0x01of vertical ancillary (VANC) space of a high definition television (HDTV) signal to develop a combined network video programming and NAS data signal, the data inserter comprising a data formatter configured to format the NAS data and a multiplexer configured to combine the network video programming and NAS data; and a transmission facility configured to transmit the combined network video programming and NAS data signal.

2. The system of claim 1, in which the NAS data is used to provide updated alert information to an affiliate station.

3. A system for dynamically receiving network alert system (NAS) information from a television network using information embedded in an HDTV signal, comprising:

a receiver configured to receive a combined network video programming and NAS data signal, the NAS data signal carried in the vertical ancillary (VANC) space of a high definition television (HDTV) signal, the receiver configured to extract the NAS data signal and the network video programming, the receiver comprising a demultiplexer configured to extract the NAS data signal from video line 12, data ID (DID) 0x53, secondary data ID (SDID) 0x01of the vertical ancillary space of the HDTV signal and a data formatter configured to format the extracted NAS data into an XML/HTML format; and a station master control system configured to receive the extracted NAS data signal.

4. The system of claim 3, in which the NAS data signal is used to provide updated alert information to an affiliate station.

5. A method for dynamically transmitting network alert system (NAS) information from a television network to an affiliate station using information embedded in an HDTV signal, comprising:

providing updated NAS data;

providing network video programming;

inserting the NAS data into video line 12, data ID (DID) 0x53, secondary data ID (SDID) 0x01of vertical ancillary (VANC) space of a high definition television (HDTV) signal to develop a combined network video programming and NAS data signal, the inserting comprising formatting the NAS data and combining the network video programming and NAS data; and transmitting the combined network video programming and NAS data signal.

6. The method of claim 5, further comprising providing updated alert information to an affiliate station.

* * * * *